UNITED STATES PATENT OFFICE.

FRANK PREVOST, OF OAKLAND, CALIFORNIA.

PROCESS OF PREPARING A FOOD PRODUCT.

1,076,147.   Specification of Letters Patent.   Patented Oct. 21, 1913.

No Drawing.   Application filed December 26, 1912.   Serial No. 738,641.

*To all whom it may concern:*

Be it known that I, FRANK PREVOST, a citizen of the United States of America, residing at Oakland, in the county of Alameda and State of California, have invented certain new and useful Improvements in the Process of Preparing a Food Product, of which the following is a specification.

This invention relates to a process of preparing a food product. Patent 1,028,005, issued May 28, 1912, in which I am the assignee discloses the combining of complete fresh eggs, sugar and cream, and by "complete" I mean both the white and the yolk of the egg.

In my co-pending application, Serial Number 723,154, filed September 30, 1912, I claim the preparation in powdered form of the whites of eggs, together with the proper amount of sugar, but with the cream omitted.

This present invention comprises the process of preparing in powdered form the yolk of the egg, together with the proper amount of sugar, but with the cream omitted.

In many cases it is desired to use the white and yolk separately, and by preparing them separately they may be used separately or may be combined in any desired proportion after being reduced to powdered form.

In carrying out the present invention, the desired amount of sugar is added to the yolks after said yolks have been separated from the whites, and the composition consisting of said sugar and yolks is then beaten from time to time and permitted to become dry. The resultant product is reduced to powdered form, and is ready for the market. While the proportion of sugar may be somewhat varied, I have found that approximately five-eighths as much sugar, by weight, as of egg, produces a very desirable product. For instance, to twenty-four ounces of the yolks of eggs is added fifteen ounces of sugar. In this respect the product radically differs from that set forth in the above named patent, where approximately twice as much sugar as of egg was used.

From the foregoing description it is apparent that this process produces a powdered product useful in the culinary arts, one which can be kept for an indefinite period without spoiling, and one which is very convenient to handle.

By virtue of this invention it is possible to reduce the eggs to economical form in country districts and at times when eggs are plentiful, and to ship the products long distances to the market. The great care necessary in packing eggs need not be used in packing this product, and here again further economy is achieved.

I am aware of the fact that the yolks of eggs are daily used in cooking and that the yolks of eggs are frequently combined with sugar in cooking, but I am not aware that the said ingredients have ever been reduced to this form in the manner set forth or in the proportions indicated.

It is believed that with the creation of the parcels post, a method of rendering it possible to ship the eggs in powdered form will be found of great value and benefit to the household.

Having described my invention, what I claim is:

The herein described process of preparing a food compound consisting in separating the whites and yolks of eggs, adding sugar to said yolks, thoroughly whipping said sugar and yolks from time to time until the same become dry and reducing the resultant product to powdered form.

In testimony whereof I affix my signature in presence of two witnesses.

FRANK PREVOST.

Witnesses:
JOSEPHINE DES NOYERS,
C. P. BACON.